US008116520B2

(12) United States Patent
Reinpoldt, III (10) Patent No.: US 8,116,520 B2
(45) Date of Patent: Feb. 14, 2012

(54) SYSTEM AND METHOD FOR OVERLAYING COMPUTER GENERATED HIGHLIGHTS IN A DISPLAY OF MILLIMETER WAVE IMAGERY

(75) Inventor: Willem H. Reinpoldt, III, Windermere, FL (US)

(73) Assignee: Microsemi Corporation, Aliso Viejo, CA (US)

( * ) Notice: Subject to any disclaimer, the term of this patent is extended or adjusted under 35 U.S.C. 154(b) by 904 days.

(21) Appl. No.: 12/142,982

(22) Filed: Jun. 20, 2008

(65) Prior Publication Data

US 2009/0060272 A1 Mar. 5, 2009

Related U.S. Application Data

(60) Provisional application No. 60/945,266, filed on Jun. 20, 2007.

(51) Int. Cl.
*G06K 9/00* (2006.01)
*G09G 5/00* (2006.01)
(52) U.S. Cl. .................. 382/103; 382/100; 345/629
(58) Field of Classification Search .............. 382/100, 382/103; 345/629
See application file for complete search history.

(56) References Cited

U.S. PATENT DOCUMENTS 6,828,556 B2 * 12/2004 Pobanz et al. .............. 250/336.1
2005/0230604 A1 * 10/2005 Rowe et al. .................... 250/221
2009/0058710 A1 * 3/2009 Levitan et al. ................... 342/22

OTHER PUBLICATIONS

Chen et al., Y"Imaging for Concealed Weapon Detection," IEEE Signal Processing Magazine, Mar. 2005, pp. 52-61.*
Yujiri et al., "Passive Milimeter-Wave Imaging," IEEE microwave magazine, Sep. 2003, pp. 39-50.*
Haworth et al., "Image Processing Techniques for Metallic Object Detection with Millimetre-wave Images," ScienceDirect, Pattern Recognition Letters 27 (2006) pp. 1843-1851.*

* cited by examiner

*Primary Examiner* — Andrew W Johns
*Assistant Examiner* — Shefali Goradia
(74) *Attorney, Agent, or Firm* — Holland & Hart LLP (57) ABSTRACT

A system and method for overlaying computer-generated highlights in a display of millimeter wave imagery is disclosed. In a particular embodiment, visible spectrum and algorithmically created images are displayed adjacent to corresponding millimeter wave imagery on a graphical user interface (GUI). The millimeter wave imagery is used to detect a threat such as a concealed object. A computer generated highlight coinciding with a location of the detected concealed object is used to automatically overlay at least one or more of the visible spectrum images, algorithmically created images, and millimeter wave imagery. The computer generated highlight is encoded with information valuable for aiding the user when viewing and assessing the image date.

19 Claims, 5 Drawing Sheets

TRIANGLE   SQUARE   PENTAGON   HEXAGON

POINT   LINE   CROSS   CIRCLE

SHAPE WITH PROGRESS BAR   SHAPE WITH INDICATOR BAR   SHAPE WITH INDICATOR IN FRAME   SHAPE WITH INDICATOR RADIUS

SHAPE WITH NUMBERS   SHAPE WITH TEXT   SHAPE WITH FILL INDICATOR   SHAPE WITH INDICATOR ANGLE

SHAPE WITH COLOR   SHAPE WITH LINE WEIGHT   SHAPE WITH TRANSPARENCY   SHAPE WITH NIMBUS

SYSTEM AND METHOD FOR OVERLAYING COMPUTER GENERATED HIGHLIGHTS IN A DISPLAY OF MILLIMETER WAVE IMAGERY

I. CROSS REFERENCE TO RELATED APPLICATIONS

This application claims the benefit of U.S. Provisional Application No. 60/945,266 filed Jun. 20, 2007. The disclosure of the provisional application is incorporated herein by reference. In addition, this application relates to the subject matter of U.S. Provisional Patent Application No. 60/914,335 filed Apr. 27, 2007, and U.S. Provisional Patent Application No. 60/914,366 filed Apr. 27, 2007, the entire disclosures of which are incorporated herein by reference.

II. FIELD

The present invention relates in general to the field of imaging systems for object detection, and in particular to a system and method for overlaying computer generated highlights in a display of millimeter wave computer imagery to simplify the user interface and improve image assessment and indications.

III. DESCRIPTION OF RELATED ART

A passive millimeter wave camera has the ability to detect and image objects hidden under clothing using millimeter wave imagery. The passive millimeter wave camera detects radiation that is given off by all objects. The technology works by contrasting the millimeter wave signature of the human body, which is warm and reflective, against that of a gun, knife or other contraband. Those objects appear darker or lighter because of the differences in temperature, hence, millimeter wave energy, between the human body and the inanimate objects.

An object-based scene is generated for viewing on a video monitor with individual objects having spatial and temporal relationships. The objects may be created in any number of ways, including signals from a passive millimeter wave camera and/or signals from a visible spectrum video camera or optional infrared camera. However, no adequate method or system has been provided with the ability to attract and/or direct an observer's attention to a feature or features of an image that may have significance. Accordingly, there is a need in the relevant art for a system and method for overlaying computer generated highlights in the display of millimeter wave computer imagery to simplify the user interface and improve image assessment and indications.

Another need exists in the art for a system and method for overlaying computer generated highlights in the display of millimeter wave computer imagery that has the ability to present additional information by changing the appearance of the highlight indicator.

Another need exists in the art for a system and method for overlaying computer generated highlights in the display of millimeter wave computer imagery to present additional information by changing the behavior of the highlight indicator.

Another need exists in the art for a system and method for overlaying computer generated highlights in the display of millimeter wave computer imagery to present additional information by embedding different features/aspects of the highlight indicator including, but not limited to, slider bars, progress bars, rotating dials, text and numbers.

Another need exists in the art for a system and method for overlaying computer generated highlights in the display of millimeter wave computer imagery to provide an intuitive and "at-a-glance" indication of the equipment's or software program's status or condition.

Another need exists in the art for a system and method for overlaying computer generated highlights in the display of millimeter wave computer imagery to provide an intuitive and "at-a-glance" indication of the magnitude, significance or importance of a feature.

Another need exists in the art for a system and method for overlaying computer generated highlights in the display of millimeter wave computer imagery that has the capability to indicate the persistence of a feature across a period of time.

Another need exists in the art for a system and method for overlaying computer generated highlights in the display of millimeter wave computer imagery that has the ability to implement the highlight overlays either non-destructively, for example by use of a separate overlay memory or image plane, or destructively by overwriting the contents of the original image with the highlight indicator information.

However, in view of the prior art at the time the present invention was made, it was not obvious to those of ordinary skill in the pertinent art how the identified needs could be fulfilled.

IV. SUMMARY

In a particular embodiment, a method for overlaying computer generated highlights in the display of millimeter wave computer imagery is disclosed. The method includes providing a computer, visible spectrum color camera, millimeter wave camera, optional infrared camera, computer software and other components. The system and method in various embodiments provide a means to integrate the results of analysis of real-time imagery, archived imagery, and/or computer processed imagery into an easy-to-use, intuitive graphical user interface (GUI) component.

One particular advantage provided by the embodiments of the system and method for overlaying computer generated highlights in the display of millimeter wave computer imagery is to provide a seamless, intuitive, "at a glance" display of computer generated analysis results indicators. Another particular advantage of the system and method for overlaying computer generated highlights in the display of millimeter wave computer imagery is to provide an immersive representation of imagery combined with the computer analysis environment. The need to consult several different areas of a GUI in order to gather the information is eliminated by providing highlight indicators. Accordingly, the system and method eases and speeds operator training requirements due to its simplicity, intuitiveness and graphical nature. In addition, the system and method can lengthen the operator training retention time due to its simplicity, intuitiveness and graphical nature and reduce the possibility of operator error by providing a concise, concentrated and comprehensive display versus having the same information manually collected from several separate sources in the GUI.

Another particular advantage of the system and method for overlaying computer generated highlights in the display of millimeter wave computer imagery is to improve the performance and ease of use of computer equipment by providing the operator unparalleled access to a wealth of image and process information. The reliability of operator image assessments is improved using a simple and fast method of assessing image processing indications by providing an intuitive means for displaying to the operator the analysis results, feature detections and/or feature severities as graphical overlays to the displayed imagery.

Yet another particular advantage of the system and method for overlaying computer generated highlights in the display of millimeter wave computer imagery is to provide a technique for compressing information and status indications into innocuous computer generated highlight indicators that augments information displays.

Other aspects, advantages, and features of the present disclosure will become apparent after review of the entire application, including the following sections: Brief Description of the Drawings, Detailed Description, and the Claims.

VI. DETAILED DESCRIPTION

Millimeter wave cameras are detection devices that are operative to detect differences or contrast between millimeter wave energy (e.g., electromagnetic wave energy lying in the 30-300 GHz range) that is naturally emitted by the body of an individual and millimeter wave energy that is emitted, reflected, absorbed or otherwise attenuated by any object concealed on that individual. In a particular illustrative embodiment, a standard video camera and optional infrared camera are operative to produce continuous dynamic images on a real-time basis that relate spatially and temporally to the millimeter wave imagery. The millimeter wave imagery shows any concealed object(s) revealed by the contrast-based imagery that was generated in conjunction with the millimeter wave camera.

The present invention is described below with reference to graphical illustrations of methods and devices to create, modify, and use user interfaces. It is understood that each element of the user interface may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts necessary to display the user interface element shown.

The disclosed system and method includes computer software which integrates into the GUI and/or imagery computer generated highlights and/or annotations that overlay displayed imagery. Each highlight indicator may be encoded with information valuable for aiding the observer when viewing the imagery. The computer generated highlight indicators are, in various embodiments, noninvasive to the operator interface and controls. Each highlight indicator can be a repository of additional, valuable information for operator assessment of the image data.

In one particular illustrative embodiment, the disclosed system and method is utilized in connection with a concealed object/weapons detection system (WDS) that is used for screening people. Examples of such systems include the BIS WDS Gen2 system available from Brijot Imaging Systems, Inc. of Orlando, Fla. The software of such systems normally displays one or more images, including live video images received from a visible color camera, raw millimeter wave images received from a millimeter wave camera, and an algorithmically created image generated by a computer and an infrared image received from an optional infrared camera. These images are typically displayed side-by-side on a GUI.

The presently disclosed system and method transforms the passive imagery into an interactive, information-rich environment with the inclusion of computer generated highlight indicators and/or annotations. In the process of displaying various types of information or data, the highlights can assume a wide variety of characteristics.

Figure 1:
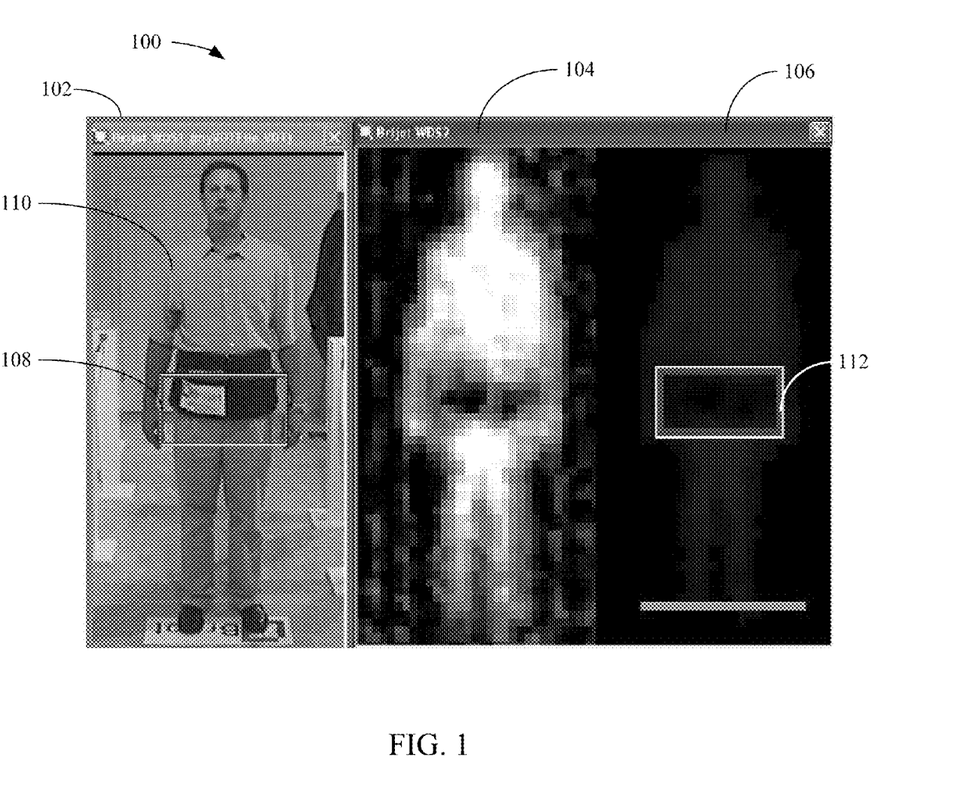
FIG. 1 is a screen shot of a particular illustrative embodiment of the graphical user interface incorporating the software modules of the system for overlaying computer generated highlights in the display of millimeter wave computer imagery.

FIG. 1 shows a graphical illustration of a particular embodiment of the presently disclosed user interface 100 for the system and method of overlaying computer generated highlights in the display of millimeter wave computer imagery. The user interface 100 in this embodiment displays, from left to right, color video 102, raw millimeter wave imagery 104, and algorithmically created images 106 with highlight indicators. The highlight indicator can assume the form of a recognizable shape including, but not limited to, a point, line, 'x', square, rectangle, polygon, circle, or ellipse. As illustrated in FIG. 1, a rectangular highlight indicator 108 is shown in the color video image 102 disposed visually at an area on the subject 110 that has been determined to have significance or indicate the presence of a concealed object. A rectangular highlight indicator 112 is shown at the same location in the algorithmically created image 106.

Figure 2:
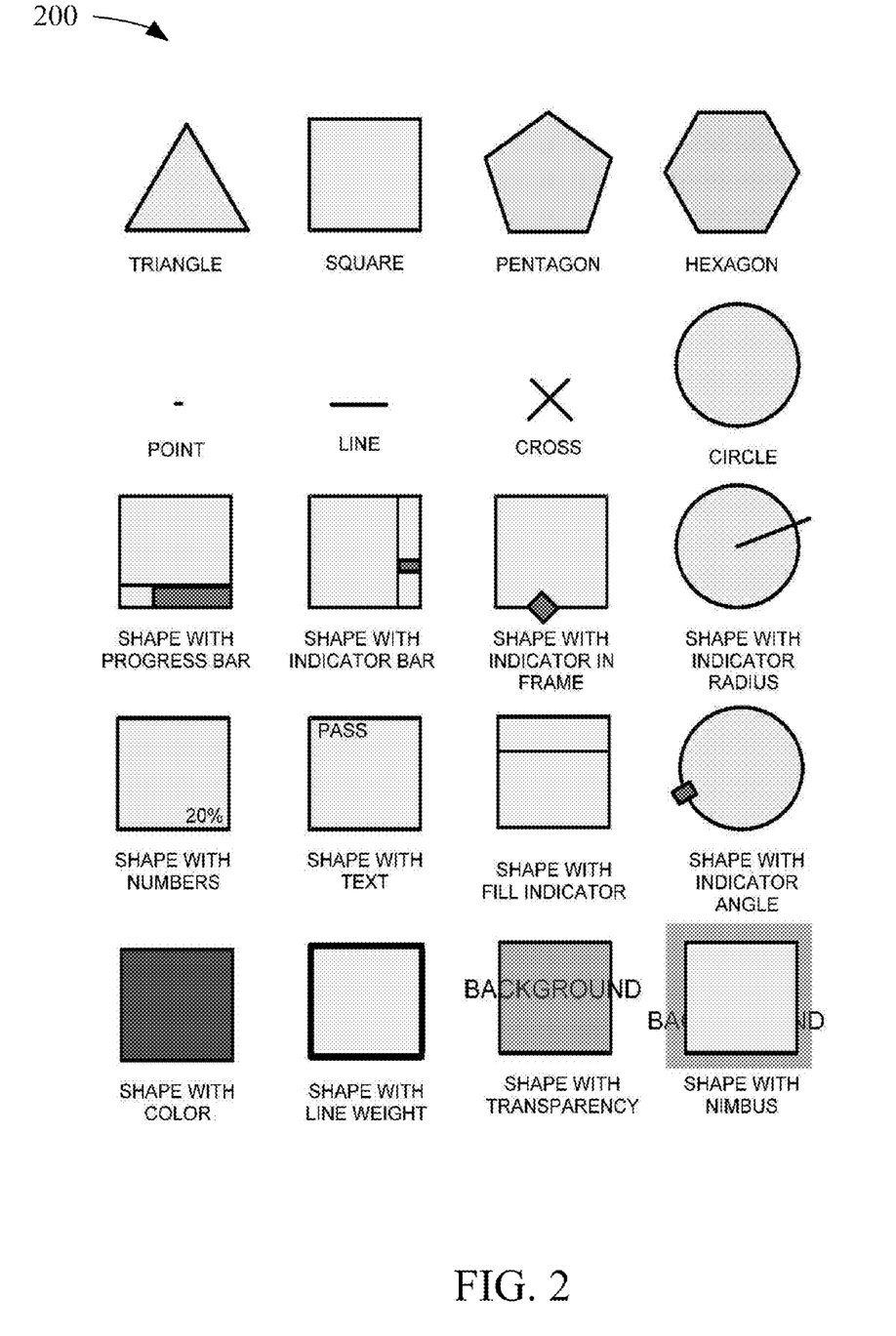
FIG. 2 are examples of highlight indicators used with a particular illustrative embodiment of a system for overlaying computer generated highlights in the display of millimeter wave computer imagery.

FIG. 2 shows examples of shapes 200 that may be used with the system and method for overlaying computer generated highlights in the display of millimeter wave computer imagery. The selection of the shape geometry may be fixed or may vary depending on the nature of the indication. In one embodiment, only rectangular highlight indicators may be used. In another embodiment, a circle highlight indicator may be used for warning conditions while a triangle highlight indicator may be used for high alert conditions. In yet another embodiment, the shape of the highlight may change depending on the progression of a set of analysis algorithms; for instance, the first executing algorithms would generate polygons with low vertices counts while subsequent algorithms would increment the number of vertices in their polygons (triangle, square, pentagon, hexagon, and so forth).

In another particular illustrative embodiment, a horizontal or vertical slider bar is integrated into the edge of a rectangular highlight indicator, with the position of the slider indicative of some other information. In addition, a horizontal or vertical progress indicator bar may be integrated into the highlight for a straight line, with the progress/fill amount indicative of some other information. In yet another embodiment, a radial line or fill level in a circular highlight indicator would indicate useful information, similar to the hour hand of an analog clock.

If shapes are used for the highlight indicator, the shape may be filled and/or unfilled, with the filled or unfilled property of the shape imparting some information to the observer such as, in one example, filled denotes a high probability feature match while unfilled denotes a low probability feature match. In another embodiment, the shape may have a ratio of filled to unfilled area, with that ratio imparting some additional information to the observer. In yet another embodiment, the shape may have differing levels of translucency or transparency, with the amount of translucency or transparency indicating some information such as the degree of probability of a match.

If shapes are used for the highlight indicator, the interface may be configured to cause the line widths or border of the shape to change. In such embodiment, the boldness, color, pattern or texture of the border imparts additional information to the observer. In one embodiment, a rectangular highlight indicating one classification of feature (e.g., concealed object detected) has a thin, solid border if the object were evaluated to be benign, and have a bold, dashed, marquee-type boarder if the object were evaluated to be malevolent. In another embodiment, the nature of the border varies (e.g., pulsates) in accordance with the significance of the feature. In yet another embodiment, the straightness of the lines and/or boarders may be made to change so that, for example, a rectangle with straight lines denotes a high-confidence feature while a rectangle with wavy lines denotes a lower-confidence feature. In this case, both the presence and degree of waviness may itself impart additional information to the observer.

If shapes are used for the highlight indicator, the shape may be made to rotate. In this case, the direction of rotation and/or the speed of rotation would impart additional information to the observer. In one embodiment, a triangular highlight indicating one classification of feature (e.g., concealed object detected) would rotate counter-clockwise if the object were evaluated to be benign, and rotate clockwise if the object were evaluated to be malevolent. In another embodiment, the speed of the shape's rotation would vary with the significance of the feature. In yet another embodiment, the axis of rotation may impart additional information such as a smoothly rotating square denotes one condition while an off-axis rotating square denotes another condition. In this case, the degree of off-axis rotation or the location of the rotational axis may itself impart additional information to the observer.

The location of the highlight indicator may be made to coincide with the location of the feature or attribute it is indicating. In the case of concealed object detection, the highlight indicator location would coincide with the location of the detected concealed object.

The size of the highlight indicator may be made to vary depending on the size or importance of the indicated feature. In embodiments that are used for concealed object detection, the width and height of a rectangular highlight indicator may coincide with the dimensions of the detected concealed object. In another embodiment, the centroid of the highlight may be centered coincident with the indicated feature, but the relative size of the highlight would change with the importance or size of the feature; for instance, an important feature might have a substantially larger highlight indicator than that of a trivial feature.

The color of the highlight indicator may be made to vary depending on information to be imparted to the observer. In one case, the color may indicate which of several different computer algorithms was responsible for detecting the feature, or in need of indicating the feature; for instance, a "hot object" detection algorithm may use red highlights while a "cold object" detection algorithm may use blue highlights. In another case, the color may indicate the relative severity, or importance of the feature; for instance, an "important" feature may be displayed with a red highlight while a "trivial" feature may be displayed with a yellow highlight. In another case, the color may indicate an acceptance criterion of the feature; for instance, an acceptable feature may be displayed with a green highlight while an unacceptable feature may be displayed with a red highlight.

The highlight indicator may be made to pulsate depending on information to be imparted to the observer. The pulsation may affect the highlight's shape, size, color, intensity, rotation, line width, transparency, or any combination thereof. In addition, the rate of pulsation may be made to vary depending on other information to be conveyed. For example, a solid red highlight might indicate a feature consistently observed by an image analysis algorithm, while a slowly pulsating red highlight might indicate a feature that is inconsistently observed by the algorithm. The degree to which the feature is observed by the algorithm may contribute to the rate of pulsation.

In place of, or in addition to, the use of shapes, the present system and method may portray an aura, corona, radiance and/or nimbus as an indicator of information when creating a computer generated highlight for a feature. As is the case with shapes, the aura, corona, radiance and/or nimbus can use various shapes, colors, translucency/transparency, luminosity, sizes, and/or pulsations can be used to convey additional information to the observer.

The presently disclosed system and method may cause the highlight indicators to appear to float over an area of interest. In one case, the degree of floatation/movement may correspond to some other information. For instance, for features whose location are precisely determined, the highlights may be firmly anchored with little or no movement while for features whose location are less precisely known, the highlights may float with a progressive amount of movement relating to the lack of precision of the location.

Figure 3:
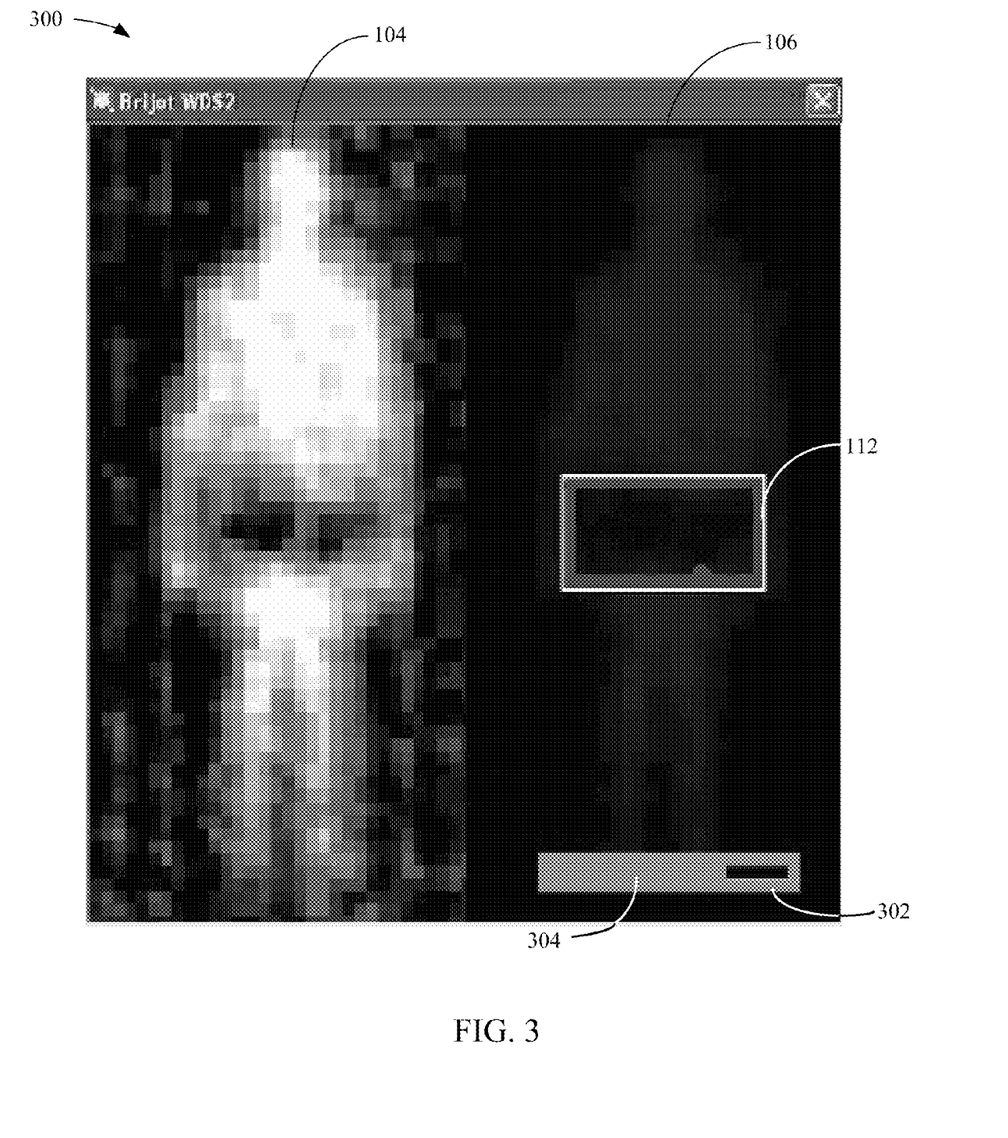
FIG. 3 is a screen shot of a particular illustrative embodiment of the graphical user interface that includes an embedded slider bar and progress bar indicators.

FIG. 3 shows a graphical illustration of an embodiment of the present interface 300 that includes an embedded slider bar 302 and progress bar 304 disposed at the bottom portion of the algorithmically created image 106. Indicators such as these may be embedded within, or in place of, those indicators discussed above. The rectangular highlight indicator 112 is shown overlaying the algorithmically created image 106.

The system and method may be configured to indicate the persistence of a feature over a period of time. In this case, the higher persistence the feature over time, the boldness, definition and/or the more vivid or well defined the highlight indicator. The less the persistence, the higher degree of thinness, fading or translucence of the indicator. In operation, the observer would utilize the system as an indicator(s) of features of interest overlaying an image(s) from a single source or a variety of sources. The indicators would themselves be indicative of other aspects of the feature including, but not limited to, algorithm performance, confidence levels, severity, and/or importance.

Figure 4:
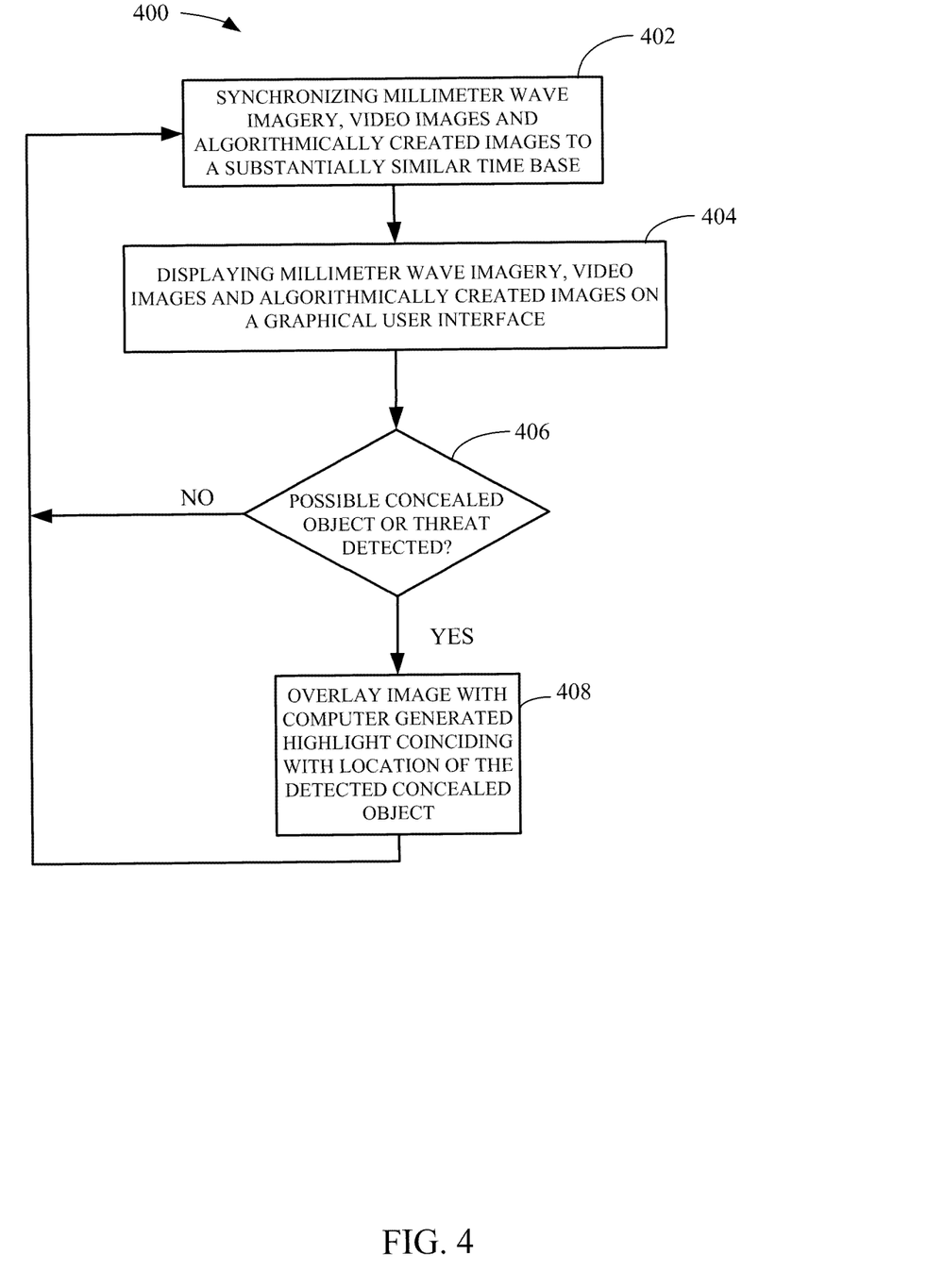
FIG. 4 is a flow diagram of a particular embodiment of a method for overlaying computer generated highlights in the display of millimeter wave computer imagery.

Referring to FIG. 4, a particular illustrative embodiment of a method for overlaying computer-generated highlights in the display of millimeter wave computer imagery is disclosed and generally designated 400. Millimeter wave imagery, video images and algorithmically created images are synchronized to a substantially similar time base at 402. The algorithmically created images, video images and the millimeter wave imagery, or any combination thereof, can be displayed at 404. If a concealed object or other user-defined feature is detected at 406, then at 408 the images are overlaid with computer generated highlights coinciding with the location of the concealed object. The millimeter wave imagery, video images and algorithmically created images with the computer generated highlights can be stored and accessed for playback and review.

Figure 5:
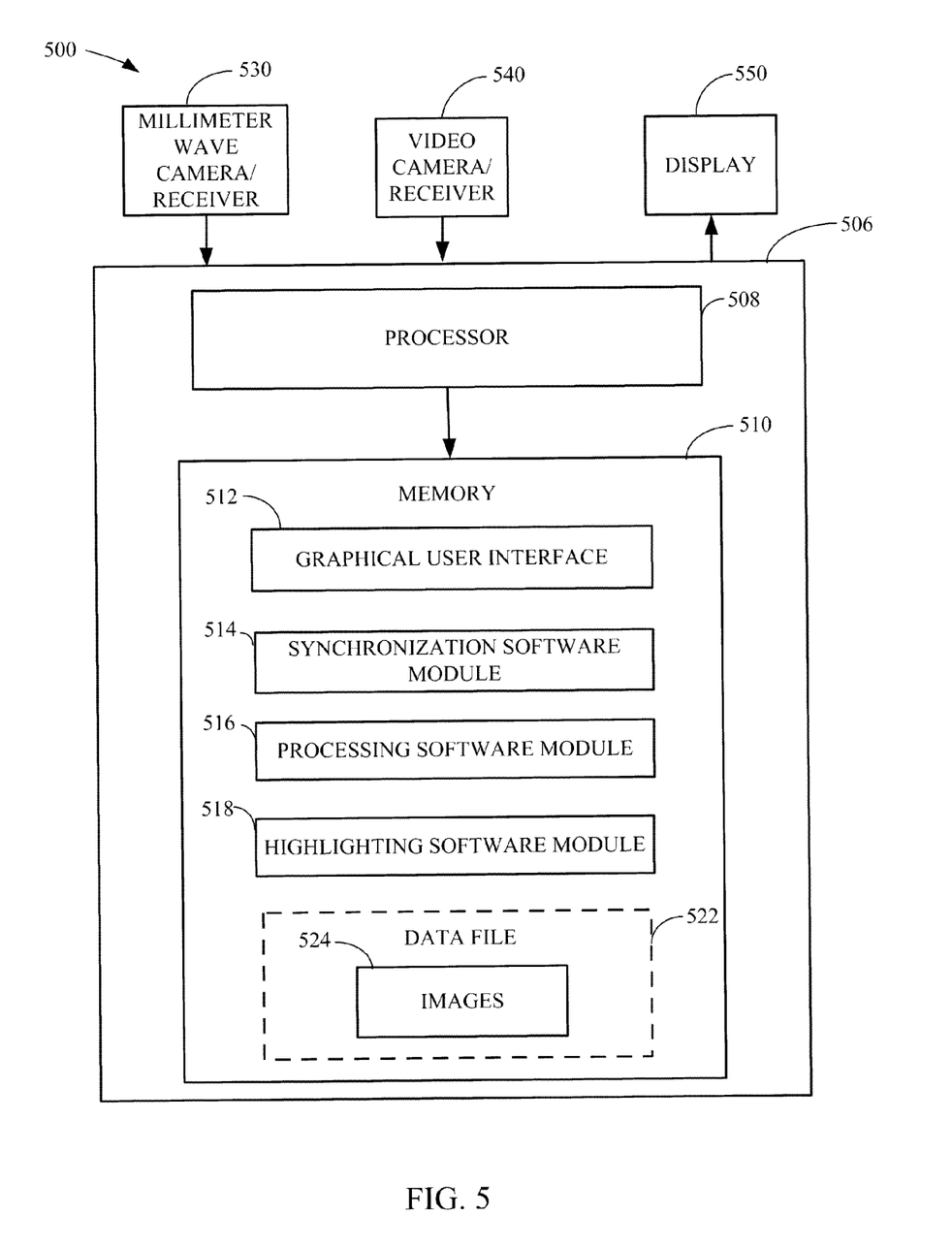
FIG. 5 is a block diagram of a particular illustrative embodiment of a system for overlaying computer generated highlights in the display of millimeter wave computer imagery.

A block diagram of a particular embodiment of a system for manipulating real-time video playback time-synchronized with millimeter wave imagery is disclosed in FIG. 5 and generally designated 500. In a particular embodiment, the system 500 may be configured to perform the methods depicted in FIG. 4. The system 500 includes a device 506 having at least one processor 508 and a memory 510 that is accessible to the processor 508. The memory 510 includes media that is readable by the processor 508 and that stores data and program instructions of software modules that are executable by the processor 508, including a graphical user interface 512 for defining and controlling computer generated highlight indicators and/or annotations, a synchronization software module 514 for synchronizing the visible spectrum imagery 102, algorithmically created imagery 106, and the millimeter wave imagery 104, a processing software module 516 for generating the algorithmically created imagery 106 and millimeter wave imagery 104, a highlighting software module 518 for overlaying the images 102, 106 with computer generated highlights coinciding with the location of a concealed object, and a data file 522 that includes recorded images 524. A millimeter wave camera and receiver 530, a video camera and receiver 540, and a display 550 are coupled to the device 506. In a particular embodiment, the graphical user interface 512 may include a keyboard, a pointing device, a touch screen, a speech interface, another device to receive user input, or any combination thereof.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method for overlaying computer-generated highlights in a display of millimeter wave computer imagery, the method comprising:

displaying millimeter wave imagery on a graphical user interface (GUI);

displaying visible spectrum images on the graphical user interface, wherein the visible spectrum images are spatially and temporally relative to the millimeter wave imagery;

displaying algorithmically created images on the graphical user interface, wherein the algorithmically created images are spatially and temporally relative to the millimeter wave imagery;

synchronizing the millimeter wave imagery, the visible spectrum images and the algorithmically created images to a substantially identical time base; and overlaying at least one or more of the visible spectrum images, algorithmically created images, and millimeter wave imagery with a computer generated highlight coinciding with a location of a detected threat.

2. The method of claim 1, further comprising detecting the threat using the millimeter wave imagery.

3. The method of claim 1, wherein the computer generated highlight is a shape.

4. The method of claim 3, wherein the shape is at least one of a point, a line a "x", a square, a rectangle, a polygon, a circle or an ellipse.

5. The method of claim 3, wherein the shape of the computer generated highlight changes from a first shape to a different second shape when the threat is detected.

6. The method of claim 3, wherein visually filling the shape corresponds to a probability of a feature match.

7. The method of claim 3, wherein a transparency of the shape corresponds to a probability of a feature match.

8. The method of claim 1, wherein a warning highlight coincides with a warning condition of the detected threat.

9. The method of claim 8, wherein a high alert highlight coincides with a high alert condition of the detected threat.

10. The method of claim 1, wherein the GUI further comprising a rectangular slider bar to visually indicate data to a user.

11. The method of claim 1, wherein the computer generated highlight is a circular highlight having a radial indicator to visually indicate data to a user.

12. The method of claim 1, wherein a characteristic of a border of the computer generated highlight visually indicates data to a user.

13. The method of claim 1, wherein the threat is a detected explosive object, threat object, contraband object, stolen object or otherwise concealed object.

14. A system for overlaying computer-generated highlights in a display of millimeter wave computer imagery, the system comprising:
- millimeter wave imagery for display on a graphical user interface (GUI);
- visible spectrum images for display on the GUI, wherein the visible spectrum images are spatially and temporally relative to the millimeter wave imagery;
- algorithmically created images for display on the GUI, wherein the algorithmically created images are spatially and temporally relative to the millimeter wave imagery;
- a synchronization software module for synchronizing the visible spectrum images, algorithmically created images, and the millimeter wave imagery; and
- a highlighting software module for overlaying the visible spectrum images with a computer generated highlight coinciding with a location of a detected threat.

15. The system of claim 14 further comprising:
- a processing software module for generating the algorithmically created images and millimeter wave imagery.

16. The system of claim 14, further comprising:
- a memory device for recording the millimeter wave imagery and corresponding algorithmically created images and visible spectrum images.

17. The system of claim 14, wherein the millimeter wave imagery is used to detect the threat.

18. The system of claim 14, wherein the threat is a detected explosive object or otherwise concealed object.

19. The system of claim 14, wherein the GUI further comprising user controls for determining at least one characteristic of the computer generated highlight.

* * * * *